(12) United States Patent
Baldwin et al.

(10) Patent No.: US 8,753,066 B1
(45) Date of Patent: Jun. 17, 2014

(54) TANK-TO-TANK PENSTOCK ELECTRIC GENERATOR SYSTEM

(76) Inventors: David L. Baldwin, Fort Lauderdale, FL (US); Kesha B. Nickerson, Fort Lauderdale, FL (US)

( * ) Notice: Subject to any disclaimer, the term of this patent is extended or adjusted under 35 U.S.C. 154(b) by 756 days.

(21) Appl. No.: 12/927,096

(22) Filed: Nov. 5, 2010

(51) Int. Cl.
*F04D 23/00* (2006.01)

(52) U.S. Cl.
USPC .................... 415/6; 416/197 R; 416/197 A

(58) Field of Classification Search
USPC .................. 415/2.1, 3.1, 6, 905, 916, 906; 416/DIG. 4, 197 R, 197 A; 290/54, 43
See application file for complete search history.

(56) References Cited

U.S. PATENT DOCUMENTS 4,345,160 A * 8/1982 Smith ........................... 290/52
2011/0204627 A1 * 8/2011 Ho et al. ....................... 290/43

* cited by examiner

*Primary Examiner* — Dwayne J White
(74) *Attorney, Agent, or Firm* — Frank L. Kubler; Oltman Flynn & Kubler

(57) ABSTRACT

A tank-to-tank penstock electric generator system includes a water storage tank having a storage tank lower end with a water release port; a water receiving tank below the level of the water storage tank having a receiving tank upper end with a water receiving opening; a water wheel rotatably mounted on a water wheel mounting structure and having a water wheel rotational axis positioned substantially below the level of the water release port and extending above the level of the water receiving opening; and an electric generator having a generator rotor drivably connected to the water wheel through a drivable connection, so that rotation of the water wheel rotates the generator rotor; so that water flows out of the water storage tank through the water release port, over the water wheel and into the water receiving tank through the water receiving opening, thereby rotating the water wheel and the generator rotor and generating electricity.

14 Claims, 2 Drawing Sheets

TANK-TO-TANK PENSTOCK ELECTRIC GENERATOR SYSTEM

BACKGROUND OF THE INVENTION

A-WATER.EL3

1. Field of the Invention

The present invention relates generally to the field of energy storage and conversion systems. More specifically the present invention relates to a tank-to-tank penstock electric generator system including an elevated water storage tank having a storage tank lower end with a water release port, a water receiving tank below the level of the water storage tank having a receiving tank upper end with a water receiving opening, and a water wheel rotatably mounted on a water wheel mounting structure and having a water wheel rotational axis positioned substantially below the level of the water release port and extending above the level of the water receiving opening so that water flows out of the water storage tank through the water release port, impinges on the water wheel a distance from the water wheel rotational axis to rotate the water wheel, and flows over and off the water wheel and into the water receiving tank through the water receiving opening, and including an electric generator having a generator rotor drivably connected to the water wheel so that rotation of the water wheel rotates the generator rotor and thereby generates electricity.

The system optionally includes a water release valve secured to the water storage tank, at and controlling water flow from, the water release port. The system optionally additionally includes water passage means conveying water from the water release port to the water wheel and optionally from the water wheel to the water receiving opening. The system preferably further includes a system framework which supports the water storage tank. The system preferably still further includes a water pump in fluid communication with the water storage tank and with a water source for delivering water into the water storage tank. The water source may be the water receiving tank, or may be a stream, spring or other natural water source on the property where the system is located. The water storage tank and water receiving tank may be recessed into the ground so that water can flow with gravity from a water source at ground level into the water storage tank. In this instance, or where the water source flows such as a stream does, the water pump may not be needed.

The generator preferably is fixedly fastened to either the floor of a building or to the ground, or to a generator table. The generator may be connected through a power delivery circuit to any desired device or system, such as to the electric system of a house.

2. Description of the Prior Art

There have long been generators powered by flowing water such as generators in dams. Such massive public works structures provide electric power for vast regions including entire cities. What has not been available is a water powered electric generator system for individual use, such as at houses and businesses including farms.

It is thus an object of the present invention to provide an electric generator system which is small enough to be placed on the property of most individual persons or businesses and can be powered by flowing water available at the site.

It is another object of the present invention to provide such an electric generator system which can be readily disassembled, compactly transported, and reassembled with minimal skill and effort.

It is still another object of the present invention to provide such an electric generator system which can draw water from any of a variety of water sources.

It is finally an object of the present invention to provide such an electric generator system which is relatively inexpensive to manufacture, transport and assemble.

SUMMARY OF THE INVENTION

The present invention accomplishes the above-stated objectives, as well as others, as may be determined by a fair reading and interpretation of the entire specification.

A tank-to-tank penstock electric generator system is provided, including a water storage tank having a storage tank lower end with a water release port; a water receiving tank below the level of the water storage tank having a receiving tank upper end with a water receiving opening; a water wheel rotatably mounted on a water wheel mounting structure and having a water wheel rotational axis positioned substantially below the level of the water release port and extending above the level of the water receiving opening; and an electric generator having a generator rotor drivably connected to the water wheel through a drivable connection, so that rotation of the water wheel rotates the generator rotor; so that water flows out of the water storage tank through the water release port, impinges on the water wheel a distance from the water wheel rotational axis and flows over and off the water wheel and into the water receiving tank through the water receiving opening, thereby rotating the water wheel and the generator rotor and generating electricity.

The system preferably additionally includes a water release valve secured to the water storage tank at and controlling water flow from the water release port. The system preferably additionally includes a water passage structure conveying water from the water release port to the water wheel, and from the water wheel to the water receiving opening. The system preferably includes a system framework which supports the water storage tank.

The system preferably yet further includes a water pump in fluid communication with the water storage tank and with a water source for delivering water into the water storage tank. The system preferably still further includes a water delivery conduit extending to and from the water pump for carrying water from a water source to the water pump, and from the water pump into the water storage tank. The water pump preferably is one of electrically and manually powered. Where the water pump is electrically powered, the system preferably additionally includes a float ball in the water receiving tank and mounted on a ball lever operationally connected to an electric switch which completes a circuit to and thus activates the water pump when water in the water receiving tank rises one of: to and above a certain pre-set level.

The water source is optionally one of the water receiving tank, a stream and a spring. The water storage tank and the water receiving tank optionally are recessed into the ground so that water can flow with gravity from a water source at ground level into the water storage tank.

The water wheel preferably includes a water wheel axle; first and second water wheel side walls; and a circumferential series of water wheel blades extending between the first and second water wheel side walls, and radially relative to and at a distance from the water wheel rotational axis. The water wheel preferably additionally includes a splash guard adjacent to the periphery of the water wheel for containing water flowing on and over the water wheel. The splash guard preferably includes an elongate panel arched along its length to substantially match and conform to the curvature of the periphery of the water wheel.

The drivable connection between the water wheel and the generator rotor preferably includes a water wheel pulley mounted on the water wheel axle and thereby constrained to rotate together with the water wheel; a generator pulley fixedly connected to the generator rotor and thereby constrained to rotate together with the generator rotor; and a drive belt fitted drivably around the water wheel pulley and the generator pulley.

The water storage tank preferably includes an open top trough. The system framework preferably includes several upright tank elevation posts supporting the water storage tank, and the water receiving tank preferably is positioned directly below the water storage tank. The water wheel mounting structure preferably includes two spaced apart upright wheel support panels, each support panel having an axle passing opening through which the water wheel axle rotatably passes. The generator optionally is fixedly fastened to one of: a floor of a building and the ground and a generator table.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
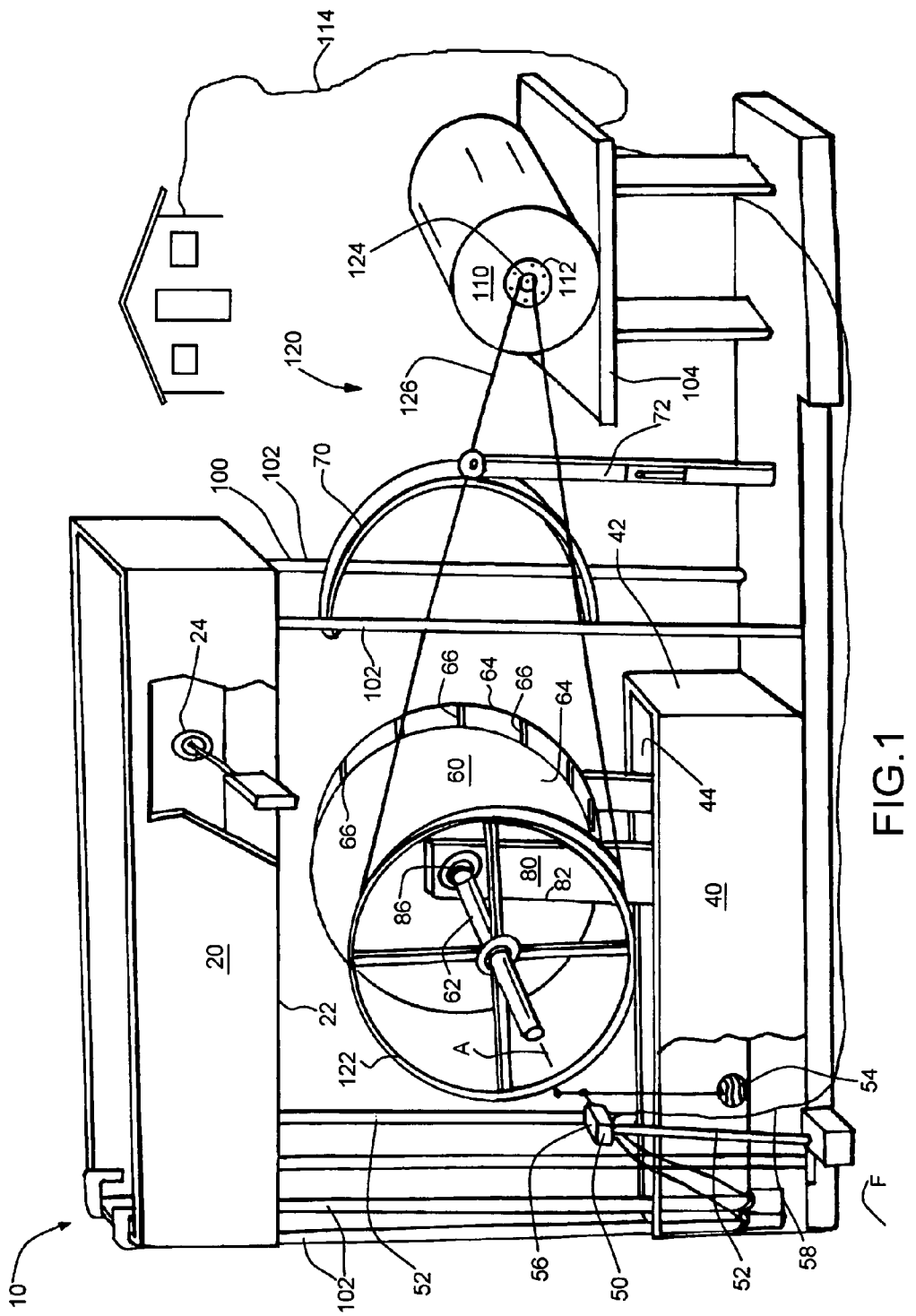
FIG. 1 is a perspective side view of the preferred embodiment of the present tank-to-tank penstock electric generator system, showing the power delivery circuit connected to the power circuit of a house.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
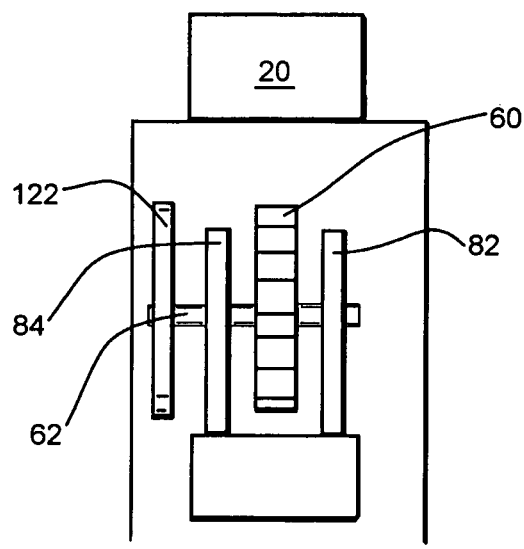
FIG. 2 is a partial top plan view of the water wheel and splash guard.
Figure 3:
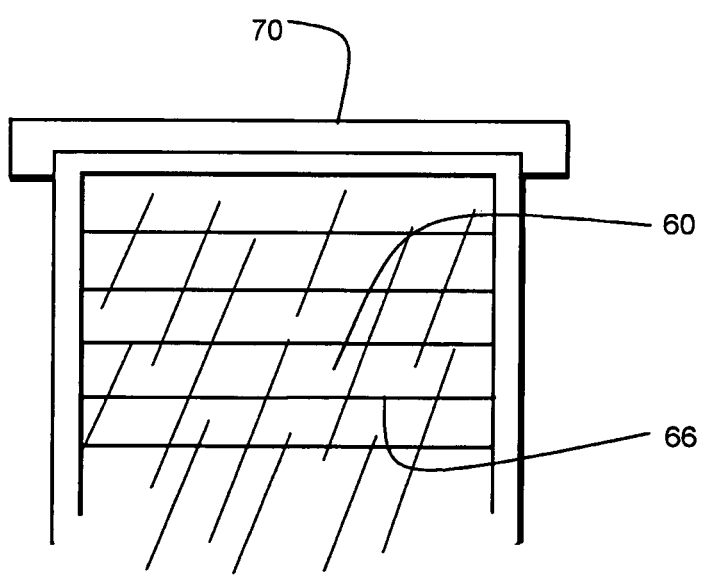
FIG. 3 is a partial end view of the system of FIG. 1, showing water flowing onto the blades of the water wheel, and also showing the upper end of the splash guard behind the water wheel.

Referring to FIGS. 1-3, a tank-to-tank penstock electric generator system 10 is disclosed including an elevated water storage tank 20 having a storage tank lower end 22 with a water release port 24, a water receiving tank 40 below the level of the water storage tank 20 having a receiving tank upper end 42 with a water receiving opening 44, and a water wheel 60 rotatably mounted on a water wheel mounting structure 80 and having a water wheel rotational axis A positioned substantially below the level of the water release port 24 and extending above the level of the water receiving opening 24 so that water flows out of the water storage tank 20 through the water release port 24, impinges on the water wheel 60 a distance from the water wheel rotational axis A to rotate the water wheel 60 about axis A, and flows over and off the water wheel 60 and into the water receiving tank 40 through the water receiving opening 44, and including an electric generator 110 having a generator rotor 112 connected to the water wheel 60 through a drivable connection 120 so that rotation of the water wheel 60 rotates the generator rotor 112 and thereby generates electricity.

The system 10 optionally includes a water release valve 26 secured to the water storage tank 20, at and controlling water flow from the water release port 24. The system 10 optionally additionally includes water passage means (not shown) conveying water from the water release port 24 to the water wheel 60 and optionally from the water wheel 60 to the water receiving opening 44. The system 10 preferably further includes a system framework 100 which supports the water storage tank 20 and generator 110. The system 10 preferably still further includes a water pump 50 in fluid communication with the water storage tank 20 and with a water source WS for delivering water into the water storage tank 20. A water delivery conduit 52 preferably extends to and from the water pump 50 to carry water from a water source WS to the water pump 50, and from the water pump 50 into the water storage tank 20. The water pump 50 may be electrically or manually operated. Where the water pump 50 is electrically operated, a float ball 54 preferably is provided in the water receiving tank 40 and mounted on a ball lever 54A operationally connected to an electric switch 56 which completes the pump circuit 58 to and thus activates the water pump 50 when the water in the water receiving tank 40 rises to or above a certain pre-set level. Thus the water source WS may be the water receiving tank 40, or may be a stream, spring or other natural water source WS on the property where the system 10 is located. The water storage tank 20 and water receiving tank 40 may be recessed into the ground so that water can flow with gravity from a water source WS at ground level into the water storage tank 20. In this instance, or where the water source WS flows, such as a stream does, the water pump 50 may not be needed.

It is preferred that two water delivery conduits 52 be provided, each having a water pump 50, so that one pump 50 and delivery conduit 52 can operate while the other pump 50 or conduit 52 is receiving repair or maintenance. Switch 56 operates one or the other of pumps 50 to the exclusion of the other, so that an operator can select which pump 50 to activate.

The water wheel 60 preferably includes a water wheel axle 62, water wheel side walls 64 and a circumferential series of water wheel blades 66 extending between the first and second water wheel side walls and radially relative to the water wheel rotational axis, A and preferably adjacent to the peripheries of the wheel side walls 64. The water wheel 60 preferably additionally includes a splash guard 70 closely adjacent to the water wheel 60 periphery for containing water flowing on and over the wheel 60. The splash guard 70 preferably includes an elongate panel arched along its length to substantially match and conform to the curvature of the water wheel 60 periphery and mounted on an upright splash guard post 72. The splash guard 70 functions to retain flowing water received from water storage tank 20 on blades 66 to maintain greater weight on the particular blades 66 to create a greater torque on water wheel 60 and thus on the generator 110.

The drivable connection 120 between the water wheel 60 and the generator 110 preferably includes a water wheel pulley 122 mounted on the water wheel axle 62 to be constrained to rotate with the water wheel 60, a generator pulley 124 fixedly connected to the generator rotor 112 which is constrained to rotate with the generator rotor 112, and a drive belt 126 fitted drivably around the water wheel pulley 122 and the generator pulley 124. Water wheel pulley 122 preferably has the same diameter as the water wheel 60, or has a larger diameter than the water wheel 60, to drive the generator pulley 124 with greater rotational speed. Two immediately adjacent water wheel pulleys 122, or a double water wheel pulley 122, optionally is provided so that two drive belt 126 can extend in different directions from water wheel pulley 122 and respectively drive rotors 112 of two generators 110.

The water storage tank 20 preferably is a rectangular open top trough, and the system framework 100 preferably includes four upright tank elevation posts 102 supporting the corners of the water storage tank 20, and the water receiving tank 40 preferably is positioned directly below the water storage tank 20. The water wheel mounting structure 80 preferably includes two spaced apart upright wheel support panels 82 and 84, each with an axle passing opening 86 through which the water wheel axle 62 rotatably passes.

The generator 110 preferably is fixedly fastened to either the floor F of a building or to the ground, or to a generator table 104. The generator 110 may be connected through a power delivery circuit 114 to any desired device or system, such as to the electric system of a house.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A tank-to-tank penstock electric generator system, comprising:
    a water storage tank having a storage tank lower end with a water release port;
    a water receiving tank below the level of said water storage tank having a receiving tank upper end with a water receiving opening;
    a water wheel rotatably mounted on a water wheel mounting structure and having a water wheel rotational axis positioned substantially below the level of said water release port and extending above the level of said water receiving opening such that water falls from the water release port onto said water wheel and the weight of the water rotates said water wheel;
    an electric generator having a generator rotor drivably connected to said water wheel through a drivable connection, such that rotation of the water wheel rotates said generator rotor;
    and a water pump in fluid communication with said water storage tank and with a water source for delivering water into said water storage tank;
    wherein said water pump is electrically powered, additionally comprising a float ball in said water receiving tank and mounted on a ball lever operationally connected to an electric switch which completes a circuit to and thus activates said water pump when water in said water receiving tank rises one of: to and above a certain pre-set level;
    such that water flows out of said water storage tank through said water release port, impinges on said water wheel a distance from said water wheel rotational axis and flows over and off said water wheel and into said water receiving tank through said water receiving opening, thereby rotating said water wheel and said generator rotor and generating electricity.

2. The system of claim 1, additionally comprising a water release valve secured to said water storage tank at and controlling water flow from said water release port.

3. The system of claim 1, additionally comprising water passage means conveying water from said water release port to said water wheel, and from said water wheel to said water receiving opening.

4. The system of claim 1, additionally comprising a system framework which supports said water storage tank.

5. The system of claim 1, additionally comprising a water delivery conduit extending to and from said water pump for carrying water from a water source to said water pump, and from said water pump into said water storage tank.

6. The system of claim 1, wherein said water pump is one of electrically and manually powered.

7. The system of claim 1, wherein the water source is one of said water receiving tank, a stream and a spring.

8. The system of claim 1, wherein said water storage tank and said water receiving tank are recessed into the ground such that water can flow with gravity from a water source at ground level into said water storage tank.

9. A tank-to-tank penstock electric generator system, comprising:
    a water storage tank having a storage tank lower end with a water release port;
    a water receiving tank below the level of said water storage tank having a receiving tank upper end with a water receiving opening;
    a water wheel rotatably mounted on a water wheel mounting structure and having a water wheel rotational axis positioned substantially below the level of said water release port and extending above the level of said water receiving opening;
    and an electric generator having a generator rotor drivably connected to said water wheel through a drivable connection, such that rotation of the water wheel rotates said generator rotor;
    such that water flows out of said water storage tank through said water release port, impinges on said water wheel a distance from said water wheel rotational axis and flows over and off said water wheel and into said water receiving tank through said water receiving opening, thereby rotating said water wheel and said generator rotor and generating electricity
    wherein said water wheel comprises:
    a water wheel axle;
    first and second water wheel side walls;
    and a circumferential series of water wheel blades extending between said first and second water wheel side walls, and radially relative to and at a distance from said water wheel rotational axis;
    wherein said water wheel additionally comprises a splashguard adjacent to the periphery of said water wheel for containing water flowing on and over said water wheel; and
    wherein said splash guard comprises an elongate panel arched along its length to substantially match and conform to the curvature of the periphery of said water wheel.

10. The system of claim 9, wherein said drivable connection between said water wheel and said generator rotor comprises:

a water wheel pulley mounted on said water wheel axle and thereby constrained to rotate together with said water wheel;

a generator pulley fixedly connected to said generator rotor and thereby constrained to rotate together with said generator rotor;

and a drive belt fitted drivably around said water wheel pulley and said generator pulley.

11. The system of claim 9, wherein said water storage tank comprises an open top trough.

12. The system of claim 11, wherein said system framework comprises a plurality of upright tank elevation posts supporting said water storage tank, and wherein said water receiving tank is positioned directly below said water storage tank.

13. The system of claim 9, wherein said water wheel mounting structure comprises two spaced apart upright wheel support panels, each said support panel having an axle passing opening through which said water wheel axle rotatably passes.

14. The system of claim 1, wherein said generator is fixedly fastened to one of: a floor of a building and the ground and a generator table.

* * * * *